United States Patent
Chiu et al.

(10) Patent No.: US 12,401,707 B2
(45) Date of Patent: Aug. 26, 2025

(54) VIDEO CONFERENCE EVALUATION METHOD AND SYSTEM

(71) Applicant: Acer Incorporated, New Taipei (TW)

(72) Inventors: Sheng-Lin Chiu, New Taipei (TW); An-Cheng Lee, New Taipei (TW); En-Shin Chen, New Taipei (TW); Ying-Shih Hung, New Taipei (TW)

(73) Assignee: Acer Incorporated, New Taipei (TW)

( * ) Notice: Subject to any disclaimer, the term of this patent is extended or adjusted under 35 U.S.C. 154(b) by 251 days.

(21) Appl. No.: 18/303,582

(22) Filed: Apr. 20, 2023

(65) Prior Publication Data
US 2024/0275839 A1 Aug. 15, 2024

(30) Foreign Application Priority Data
Feb. 10, 2023 (TW) ................... 112104836

(51) Int. Cl.
*H04L 65/80* (2022.01)
*G06F 3/14* (2006.01)
*G06F 3/16* (2006.01)
*H04L 65/403* (2022.01)

(52) U.S. Cl.
CPC ............ *H04L 65/80* (2013.01); *G06F 3/1454* (2013.01); *G06F 3/16* (2013.01); *H04L 65/403* (2013.01)

(58) Field of Classification Search
CPC ..... H04L 65/80; H04L 65/403; G06F 3/1454; G06F 3/16
See application file for complete search history.

(56) References Cited

U.S. PATENT DOCUMENTS

| | | | |
|---|---|---|---|
| 9,769,425 B1 | 9/2017 | Lee et al. | |
| 2019/0122082 A1* | 4/2019 | Cuban | G06T 7/73 |
| 2021/0400142 A1* | 12/2021 | Jorasch | H04L 65/1069 |
| 2023/0036178 A1* | 2/2023 | Geddes | G06Q 10/1095 |
| 2023/0247078 A1* | 8/2023 | Asadipour | H04L 65/103 348/14.08 |
| 2024/0163390 A1* | 5/2024 | Hutto | H04N 5/2628 |

FOREIGN PATENT DOCUMENTS

| | | |
|---|---|---|
| CN | 111986703 | 11/2020 |
| CN | 111131756 | 11/2022 |
| TW | I449409 | 8/2014 |
| TW | I545947 | 8/2016 |
| TW | I602437 | 10/2017 |

\* cited by examiner

*Primary Examiner* — Kristie D Shingles
(74) *Attorney, Agent, or Firm* — JCIPRNET (57) ABSTRACT

Embodiments of the disclosure provide a video conference evaluation method and system. The method includes: in response to determining that a first electronic device has participated in a video conference, collecting network health information, and obtaining a transceiving state with respect to a multimedia signal; in response to determining that the network health information indicates that a network quality of the video conference is unsatisfying, obtaining a first signal segment of the multimedia signal according to the transceiving state with respect to the multimedia signal; obtaining a first specific signal feature of the first signal segment, and transmitting the first specific signal feature of the first signal segment; and providing a conference quality notification based on reception of anomalous information associated with the multimedia signal.

18 Claims, 4 Drawing Sheets

VIDEO CONFERENCE EVALUATION METHOD AND SYSTEM

CROSS-REFERENCE TO RELATED APPLICATION

This application claims the priority benefit of Taiwan application serial no. 112104836, filed on Feb. 10, 2023. The entirety of the above-mentioned patent application is hereby incorporated by reference herein and made a part of this specification.

BACKGROUND

Technical Field

The disclosure relates to a communication quality evaluation mechanism, and in particular relates to a video conference evaluation method and system.

Description of Related Art

Due to the pandemic, the demand for online video conferencing has increased significantly. During a video conference, if the voice heard by the other party is not clear, or the shared screen is not updated in real time, the reporter usually needs to wait for the response from the other party to become aware of the problems. At this time, the reporter may need to repeatedly confirm and explain, thereby wasting the time of the participants.

SUMMARY

In view of this, the disclosure provides a video conference evaluation method and system, which may be used to solve the aforementioned technical problems.

An embodiment of the disclosure provides a video conference evaluation method, including the following operation. In response to determining that a first electronic device has participated in a video conference, network health information is collected by the first electronic device, and a transceiving state with respect to a multimedia signal of the first electronic device is obtained. In response to determining that the network health information indicates that a network quality of the video conference is unsatisfying, at least one first signal segment of the multimedia signal is obtained according to the transceiving state with respect to the multimedia signal by the first electronic device. A first specific signal feature of the at least first signal segment is obtained by the first electronic device, and the first specific signal feature of the at least first signal segment is transmitted. A conference quality notification based on reception of anomalous information associated with the multimedia signal is provided by the first electronic device.

An embodiment of the disclosure provides a video conference evaluation system, including a first electronic device. The first electronic device is configured to perform the following operation. In response to determining that a first electronic device has participated in a video conference, network health information is collected, and a transceiving state with respect to a multimedia signal of the first electronic device is obtained. In response to determining that the network health information indicates that a network quality of the video conference is unsatisfying, at least one first signal segment of the multimedia signal is obtained according to the transceiving state with respect to the multimedia signal. A first specific signal feature of the at least first signal segment is obtained, and the first specific signal feature of the at least first signal segment is transmitted. A conference quality notification based on reception of anomalous information associated with the multimedia signal is provided.

DETAILED DESCRIPTION OF DISCLOSED EMBODIMENTS

Figure 1:
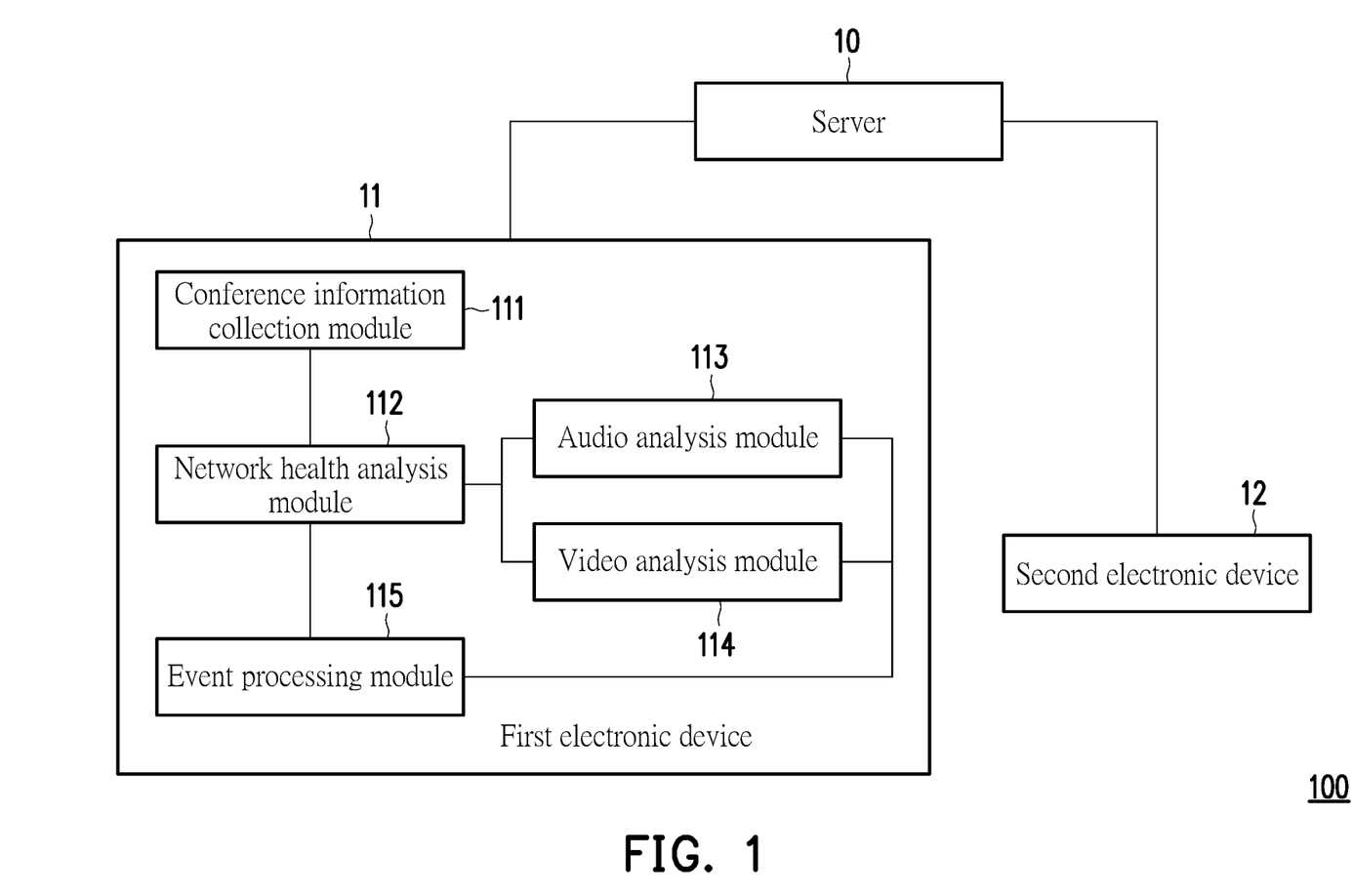
FIG. 1 is a schematic diagram of a video conference evaluation system according to an embodiment of the disclosure.

Referring to FIG. 1, FIG. 1 is a schematic diagram of a video conference evaluation system according to an embodiment of the disclosure. In FIG. 1, the video conference evaluation system 100 includes a server 10, a first electronic device 11, and a second electronic device 12. In the embodiment of the disclosure, it is assumed that the first electronic device 11 and the second electronic device 12 are electronic devices that use the same video conference software to participate in the same video conference, and the server 10 is, for example, a server corresponding to the video conference software. In other embodiments, the video conference in which the first electronic device 11 and the second electronic device 12 participate may also include other electronic devices, which are omitted for ease of illustration, but are not limited thereto.

In different embodiments, the first electronic device 11 and the second electronic device 12 may respectively be, for example, implemented as various smart devices and/or computer devices capable of running the aforementioned video conference software, but are not limited thereto.

In the embodiment of the disclosure, the first electronic device 11 and the second electronic device 12 may serve as the transmitting end and/or receiving end in the video conference according to the speaking state of the user in the video conference. For ease of understanding, the first electronic device 11 is taken as an example for illustration in the following embodiments, and those skilled in the art should be able to know the operation of the second electronic device 12 accordingly.

In the embodiment of the disclosure, the first electronic device 11 may access specific modules and program codes to implement the video conference evaluation method proposed by the disclosure, the details of which are described below.

Figure 2:
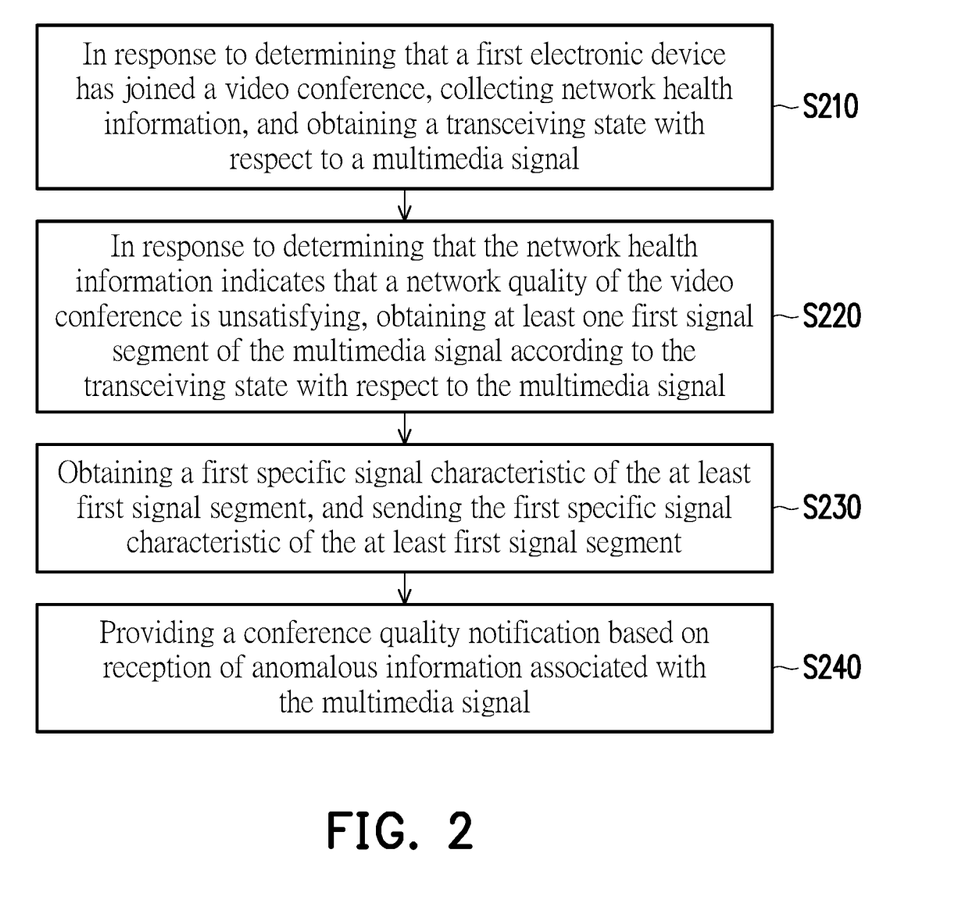
FIG. 2 is a flowchart of a video conference evaluation method according to an embodiment of the disclosure.

Referring to FIG. 2, FIG. 2 is a flowchart of a video conference evaluation method according to an embodiment of the disclosure. The method of this embodiment may be executed by the first electronic device 11 in FIG. 1, and the details of each step in FIG. 2 will be described below with reference to the elements shown in FIG. 1.

In the embodiment of the disclosure, the first electronic device 11 may include a conference information collection module 111, a network health analysis module 112, an audio analysis module 113, a video analysis module 114, and an event processing module 115, which may respectively be used to execute a portion of the steps in FIG. 2, which is described below.

First, in step S210, in response to determining that the first electronic device 11 has participated in a video conference, the conference information collection module 111 of the first electronic device 11 collects network health information, and obtains the transceiving state with respect to a multimedia signal of the first electronic device.

In different embodiments, the aforementioned network health information may include at least one of data packet round-trip time (hereinafter expressed as $T_n$), data packet loss rate (hereinafter expressed as $L_n$), audio packet round-trip time (hereinafter expressed as $T_a$), audio receiving jitter (hereinafter expressed as $J_a$), audio packet loss rate (hereinafter expressed as $L_a$), video packet round-trip time (hereinafter expressed as $B_a$), transmitted audio bit rate (hereinafter expressed as $T_v$), transmitted video frame rate (hereinafter expressed as $F_v$), and transmitted video resolution (hereinafter expressed as $H_v$), but not limited thereto.

In the first embodiment, when the first electronic device 11 is the transmitting end of the video conference, the multimedia signal considered in step S210 may include at least one of an audio signal and a video signal, and the transceiving state of the multimedia signal may include a microphone enabling state and a screen sharing state. In one embodiment, when the microphone of the first electronic device 11 is in an enabled state, it indicates that the first electronic device 11 may collect the audio signal transmitted by the user through its microphone, and accordingly provide the collected audio signal as a multimedia signal to other members of the video conference (e.g., the second electronic device 12).

In addition, when the screen sharing state of the first electronic device 11 is in an enabled state, it indicates that the first electronic device 11 may provide the screen that the user wants to share (e.g., the screen of a file and/or the user image captured by the camera) as a multimedia signal to other members of the video conference (e.g., the second electronic device 12).

In the second embodiment, when the first electronic device 11 is the receiving end of the video conference, the multimedia signal considered in step S210 may include at least one of an audio signal and a video signal, and the transceiving state of the multimedia signal may include a speaker enabling state and a screen displaying state. In one embodiment, when the speaker of the first electronic device 11 is in an enabled state, it indicates that the first electronic device 11 may play audio signals (i.e., multimedia signals) from other members of the video conference (e.g., the second electronic device 12) through its speaker. In addition, when the screen displaying state of the first electronic device 11 is in an enabled state, it indicates that the first electronic device 11 may play video signals (i.e., multimedia signals) from other members of the video conference (e.g., the second electronic device 12) through its screen.

In one embodiment, after obtaining the network health information, the network health analysis module 112 of the first electronic device 11 may determine whether the network health information indicates that the network quality of the video conference is unsatisfying.

In one embodiment, during the video conference, the network health analysis module 112 of the first electronic device 11 may determine the call quality index of the first electronic device 11 in each of the multiple call scenarios based on the collected network health information. In response to determining that the call quality index corresponding to any call scenario is lower than the corresponding index threshold, the network health analysis module 112 of the first electronic device 11 may determine that the network health information indicates that the network quality of the video conference is unsatisfying. On the other hand, in response to determining that all of the call quality index corresponding to each call scenario are not lower than the corresponding index threshold, the network health analysis module 112 of the first electronic device 11 may determine that the network health information indicates that the network quality of the video conference is satisfactory.

In an embodiment, the call scenarios may include a first call scenario, a second call scenario, a third call scenario, and a fourth call scenario, and the specific contents thereof may be shown in Table 1 below.

TABLE 1

|  | Microphone | Screen sharing state |
|---|---|---|
| First call scenario | Disabled state | Disabled state |
| Second call scenario | Enabled state | Disabled state |
| Third call scenario | Disabled state | Enabled state |
| Fourth call scenario | Enabled state | Enabled state |

In an embodiment, the first call quality index corresponding to the first call scenario may be characterized as:

$$Q_c = (W_{tn}/T_n + W_{ln}/L_n)/(W_{tn} + W_{ln})$$

In an embodiment, the second call quality index corresponding to the second call scenario may be characterized as:

$$Q_a = (W_{tn}/T_n + W_{ln}/L_n + W_{ta}/T_a + W_{ja}/J_a + W_{la}/L_a + W_{ba}*B_a)/$$
$$(W_{tn} + W_{ln} + W_{ta} + W_{ja} + W_{la} + W_{ba})$$

In an embodiment, the third call quality index corresponding to the third call scenario may be characterized as:

$$Q_v = (W_{tn}/T_n + W_{ln}/L_n + W_{tv}/T_v +$$
$$W_{fv}*F_v + W_{hv}*H_v)/(W_{tn} + W_{ln} + W_{tv} + W_{fv} + W_{hv})$$

In an embodiment, the fourth call quality index corresponding to the fourth call scenario may be characterized as:

$$Q_o = (W_{tn}/T_n + W_{ln}/L_n + W_{ta}/T_a +$$
$$W_{ja}/J_a + W_{la}/L_a*B_a + W_{ta}/T_v + W_{fv}*F_v + W_{hv}*H_v)/$$
$$(W_{tn} + W_{ln} + W_{ta} + W_{ja} + W_{la} + W_{ba} + W_{tv} + W_{fv} + W_{hv}),$$

where $W_{tn}$, $W_{ln}$, $W_{ta}$, $W_{ja}$, $W_{la}$, $W_{ba}$, $W_{tv}$, $W_{fv}$, $W_{hv}$ are the weights corresponding to $T_n$, $L_n$, $T_a$, $J_a$, $L_a$, $B_a$, $T_v$, $F_v$, $H_v$ respectively, which may each be determined by the designer according to requirements.

In an embodiment of the disclosure, the first to fourth call quality indices may be configured with a corresponding index threshold, and the network health analysis module 112 may determine whether the first to fourth call quality indices are not lower than the corresponding index threshold. If so, the network health analysis module 112 may determine that the network health information indicates that the network quality of the video conference is satisfactory. On the other hand, if any of the first to fourth call quality indices is lower than the corresponding index threshold, the network health analysis module 112 may determine that the network health information indicates that the network quality of the video conference is unsatisfying, but not limited thereto.

In step S220, in response to determining that the network health information indicates that the network quality of the video conference is unsatisfying, the first electronic device 11 obtains at least a first signal segment of the multimedia signal according to the transceiving state of the multimedia signal. Next, in step S230, the first electronic device 11 obtains the first specific signal feature of at least one first signal segment, and transmits the first specific signal feature of the at least one first signal segment.

In the first scenario of the third embodiment, the at least one first signal segment may include at least one specific audio frame, and the first electronic device 11 is, for example, the transmitting end of a video conference. In this case, the audio analysis module 113 of the first electronic device 11 may collect the recorded at least one first audio frame as the at least one specific audio frame.

In the first scenario of the third embodiment, the audio analysis module 113 may collect the most recently recorded M audio signals (where M is a positive integer) and perform audio frame blocking processing on them, so as to obtain the at least one specific audio frame.

Figure 3:
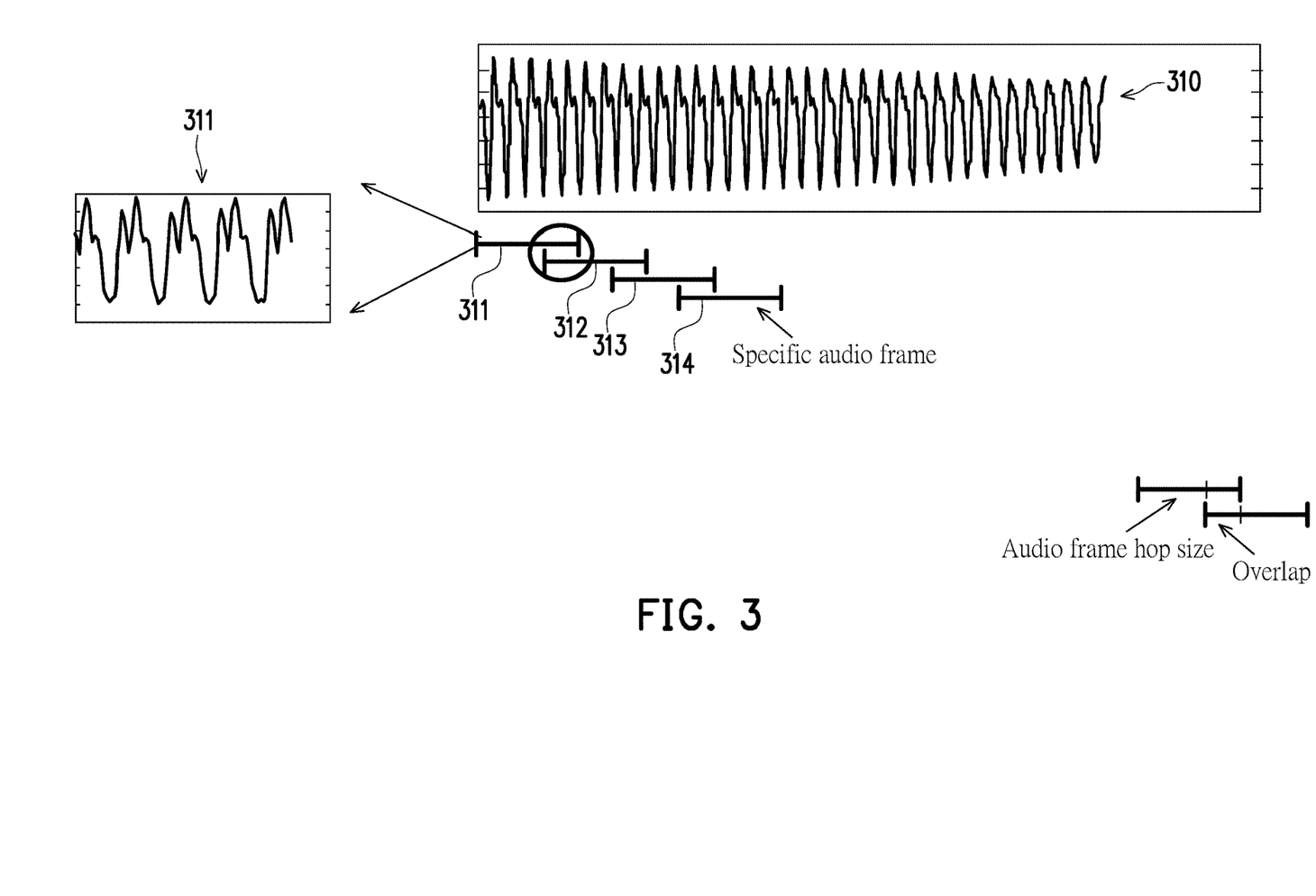
FIG. 3 is a schematic diagram of an audio frame blocking process according to a third embodiment of the disclosure.

Referring to FIG. 3, FIG. 3 is a schematic diagram of an audio frame blocking process according to a third embodiment of the disclosure. In FIG. 3, the audio signal 310 is, for example, one of the M audio signals, and the audio analysis module 113 may, for example, perform audio frame blocking processing on the audio signal 310 to generate specific audio frames 311 to 314.

In this embodiment, the audio analysis module 113 may, for example, sample 512 points of the audio signal 310 based on a sampling frequency of 16 kHz to generate a specific audio frame 311, in which the length of the specific audio frame 311 is, for example, 32 ms (i.e., 512/16000). Afterwards, the audio analysis module 113 may, for example, re-sample the audio signal 310 based on a similar principle to generate a specific audio frame 312, in which the specific audio frames 311 and 312 may, for example, overlap each other by 192 sampling points. In other words, the starting point of the specific audio frame 312 may be 320 sampling points (i.e., 512 to 192) later than the starting point of the specific audio frame 311 (which may be understood as the audio frame hop size when sampling), but not limited thereto.

Based on a similar principle, the audio analysis module 113 may re-sample the audio signal 310 to generate specific audio frames 313 and 314, in which the specific audio frames 312 and 313 may, for example, overlap each other by 192 sampling points, and the specific audio frames 313 and 314 may also overlap each other by 192 sampling points, but not limited thereto. Afterwards, the audio analysis module 113 may obtain the energy value of each specific audio frame, and generate an energy value sequence (expressed as $S_{as}$) accordingly. Afterwards, the audio analysis module 113 may use the energy value sequence $S_{as}$ as the first specific signal feature of the at least one first signal segment, and transmit the energy value sequence $S_{as}$ to the server 10.

In the second scenario of the third embodiment, the at least one first signal segment may include at least one specific audio frame, and the first electronic device 11 is, for example, the receiving end of a video conference. In this case, the audio analysis module 113 of the first electronic device 11 may collect the played at least one second audio frame as the at least one specific audio frame.

In the second scenario of the third embodiment, the audio analysis module 113 may collect the most recently played M audio signals and perform audio frame blocking processing on them, so as to obtain the at least one specific audio frame. For the related details of the audio frame blocking processing, reference may be made to the description of FIG. 3, and details are not described herein.

Afterwards, the audio analysis module 113 may obtain the energy value of each specific audio frame, and generate an energy value sequence (expressed as $S_{ar}$) accordingly. Afterwards, the audio analysis module 113 may use the energy value sequence $S_{ar}$ as the first specific signal feature of the at least one first signal segment, and transmit the energy value sequence $S_{ar}$ to the server 10.

Similarly, for the second electronic device 12, the audio analysis module (not shown) in the second electronic device 12 may also provide the corresponding energy value sequence $S_{as}$ or $S_{ar}$ as the second specific signal feature to the server 10 according to whether the second electronic device 12 is the transmitting end or the receiving end.

That is to say, in the first scenario of the third embodiment, the server 10 may, for example, receive the energy value sequence $S_{as}$ that serves as the first specific signal feature from the first electronic device 11 (i.e., the transmitting end), and receive the energy value sequence $S_{ar}$ that serves as the second specific signal feature from the second electronic device 12 (i.e., the receiving end). In addition, in the second scenario of the third embodiment, the server 10 may, for example, receive the energy value sequence $S_{as}$ that serves as the second specific signal feature from the second electronic device 12 (i.e., the transmitting end), and receive the energy value sequence $S_{ar}$ that serves as the first specific signal feature from the first electronic device 11 (i.e., the receiving end).

In the first scenario of the fourth embodiment, the at least one first signal segment may include at least one specific video frame, and the first electronic device 11 is, for example, the transmitting end of a video conference. In this case, the video analysis module 114 of the first electronic device 11 may collect the captured at least one first video frame as the at least one specific video frame.

In the first scenario of the fourth embodiment, the video analysis module 114 may obtain multiple feature points of each specific video frame, and generate a feature point vector corresponding to each specific video frame accordingly. For example, for the $i^{th}$ specific video frame, its corresponding feature point vector may be expressed as $S_{vsi}$. Afterwards, the video analysis module 114 may transmit the feature point vector corresponding to each specific video frame as the first specific signal feature of the at least one first signal segment to the server 10.

In one embodiment, the video analysis module 114 may, for example, integrate the feature point vectors corresponding to n consecutive specific video frames (where n is a positive integer) into a vector sequence $S_{vs}$ (which may be expressed as $(S_{vs1}, \ldots, S_{vsn})$), and transmit it as the first specific signal feature to the server 10, but not limited thereto.

Figure 4:
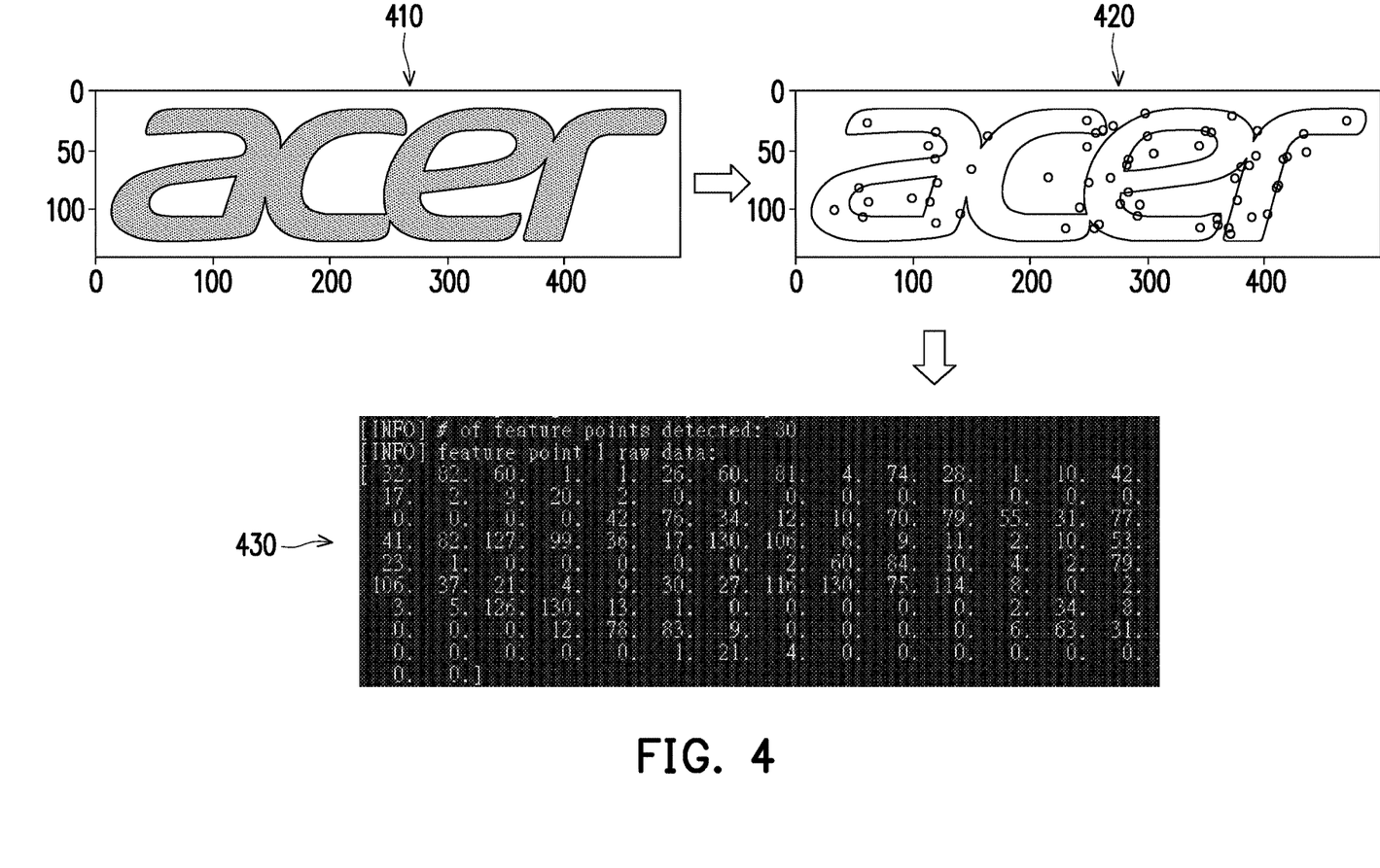
FIG. 4 is a schematic diagram of obtaining feature point vectors according to a fourth embodiment of the disclosure.

Referring to FIG. 4, FIG. 4 is a schematic diagram of obtaining feature point vectors according to a fourth embodiment of the disclosure. In this embodiment, after obtaining the specific video frame 410, the video analysis module 114 may find multiple feature points 420 (shown as hollow circles) in a specific video frame 410 based on, for example, a scale-invariant feature transform (SIFT) algorithm, and express these feature points 420 as a feature point vector 430, but not limited thereto. Next, the video analysis module 114 may transmit the feature point vector 430 (together with feature point vectors corresponding to other specific video frames) as the first specific signal feature to the server 10, but not limited thereto.

In the second scenario of the fourth embodiment, the at least one first signal segment may include at least one specific video frame, and the first electronic device 11 is, for example, the receiving end of a video conference. In this case, the video analysis module 114 of the first electronic device 11 may collect the displayed at least one second video frame as the at least one specific video frame.

In the second scenario of the fourth embodiment, the video analysis module 114 may obtain multiple feature points of each specific video frame, and generate a feature point vector corresponding to each specific video frame accordingly. For example, for the $i^{th}$ specific video frame, its corresponding feature point vector may be expressed as $S_{vri}$. Afterwards, the video analysis module 114 may transmit the feature point vector corresponding to each specific video frame as the first specific signal feature of the at least one first signal segment to the server 10. For the method of obtaining the feature point vector $S_{vri}$ by the video analysis module 114, reference may be made to the related description of FIG. 4, so the details are not repeated herein.

In one embodiment, the video analysis module 114 may, for example, integrate the feature point vectors corresponding to n consecutive specific video frames into a vector sequence $S_{vr}$ (which may be expressed as $(S_{vr1}, \ldots, S_{vrn})$), and transmit them as the first specific signal features to the server 10, but not limited thereto.

Similarly, for the second electronic device 12, the video analysis module (not shown) in the second electronic device 12 may also provide the corresponding vector sequence $S_{vs}$ or $S_{vr}$ as the second specific signal feature to the server 10 according to whether the second electronic device 12 is the transmitting end or the receiving end.

That is to say, in the first scenario of the fourth embodiment, the server 10 may, for example, receive the vector sequence $S_{vs}$ that serves as the first specific signal feature from the first electronic device 11 (i.e., the transmitting end), and receive the vector sequence $S_{vr}$ that serves as the second specific signal feature from the second electronic device 12 (i.e., the receiving end). In addition, in the second scenario of the fourth embodiment, the server 10 may, for example, receive the vector sequence $S_{vs}$ that serves as the second specific signal feature from the second electronic device 12 (i.e., the transmitting end), and receive the vector sequence $S_{vr}$ that serves as the first specific signal feature from the first electronic device 11 (i.e., the receiving end).

In one embodiment, after the server 10 respectively obtains the first specific signal feature and the second specific signal feature from the first electronic device 11 and the second electronic device 12, the server 10 may determine the similarity between the first specific signal feature and the second specific signal feature.

In the first scenario of the third embodiment (i.e., the first electronic device 11 is the transmitting end), the considered first and second specific signal features respectively are, for example, energy value sequences $S_{as}$ and $S_{ar}$. In this case, the server 10 may, for example, determine the cosine angle θ between the energy value sequences $S_{as}$ and $S_{ar}$, and then determine the similarity accordingly.

In one embodiment, $S_{ar}$ may be expressed as $(S_{ar1}, S_{ar2}, \ldots, S_{arn})$, and $S_{as}$ may be expressed as $(S_{as1},$ $S_{as2}, \ldots, S_{asn})$. In this case, the server 10 may obtain the cosine angle θ based on, for example, the relational formula $$\theta = \cos^{-1} \frac{Sar \cdot Sas}{|Sar| \times |Sas|}.$$

In this embodiment, the similarity may be, for example, negatively correlated with the cosine angle θ. That is, the larger the cosine angle θ, the lower the similarity between the first specific signal feature and the second specific signal feature (which indicates the lower the quality of the audio signal at the receiving end), and vice versa.

In one embodiment, the server 10 may, for example, convert the cosine angle θ into the similarity according to a specific relational formula. When the cosine angle θ is 0 degrees, the corresponding similarity is, for example, 100%, and when the cosine angle θ is 90 degrees, the corresponding similarity is, for example, 0%, but not limited thereto.

In other embodiments, when there are other participating electronic devices (e.g., receivers) in the video conference, these electronic devices may also transmit the corresponding energy value sequence $S_{ar}$ to the server, and the server 10 may determine the corresponding similarities one by one according to the above teaching, but not limited thereto.

In the second scenario of the third embodiment (i.e., the first electronic device 11 is the receiving end), the considered first and second specific signal features respectively are, for example, energy value sequences $S_{ar}$ and $S_{as}$. In this case, the server 10 may, for example, determine the cosine angle θ between the energy value sequences $S_{ar}$ and $S_{as}$, and then determine the similarity accordingly. For related details, reference may be made to the above description, which are not repeated herein.

In the first scenario of the fourth embodiment (i.e., the first electronic device 11 is the transmitting end), the considered first and second specific signal features respectively are, for example, vector sequences $S_{vs}$ and $S_{vr}$. In this case, the server 10 may, for example, determine the similarity between the feature point vectors $S_{vsi}$ and $S_{vri}$ based on the SIFT algorithm.

In some embodiments, the server 10 may also determine the similarity between the feature point vector $S_{vsi}$ and each of the feature point vectors $S_{vri-1}$, $S_{vri}$, and $S_{vri+1}$ at the same time, and use the highest one as the similarity corresponding to the feature point vector $S_{vsi}$. In this way, inaccurate similarity determination results due to the sampling time difference between the transmitting end and the receiving end for the video frame may be avoided.

In the second scenario of the fourth embodiment (i.e., the first electronic device 11 is the receiving end), the considered first and second specific signal features respectively are, for example, vector sequences $S_{vr}$ and $S_{vs}$. In this case, the server 10 may, for example, determine the similarity between the feature point vectors $S_{vsi}$ and $S_{vri}$ based on the SIFT algorithm. For related details, reference may be made to the above description and related documents of SIFT, which are not repeated herein.

In an embodiment, the server 10 may determine whether the similarity is lower than a similarity threshold. If not, it indicates that there is no significant difference between the quality of the multimedia signal transmitted by the transmitting end and the quality of the multimedia signal received by the receiving end. In this case, the server 10 may not transmit the anomalous information related to the multimedia signal to the first electronic device 11 and the second electronic device 12.

On the other hand, if the similarity is lower than the similarity threshold, it indicates that there is a certain degree of difference between the quality of the multimedia signal transmitted by the transmitting end and the quality of the multimedia signal received by the receiving end. In this case, the server 10 may transmit the anomalous information related to the multimedia signal to the first electronic device 11 and/or the second electronic device 12.

Referring to FIG. 2 again, in step S240, the event processing module 115 of the first electronic device 11 provides a conference quality notification according to the reception of the anomalous information associated with the multimedia signal.

In the fifth embodiment, the first electronic device 11 is, for example, a transmitting end of a video conference, and the multimedia signal includes an audio signal. In the first scenario of the fifth embodiment, in response to determining that no anomalous information related to the multimedia signal is received when the microphone of the first electronic device 11 is in the enabled state, the event processing module 115 may provide a first conference quality notification. The first conference quality notification indicates that the receiving end of the video conference (e.g., the second electronic device 12) is normally receiving the audio signal transmitted by the first electronic device 11. In this way, the user of the first electronic device 11 may know that the spoken content has been successfully received by other participants in the video conference.

In the second scenario of the fifth embodiment, in response to determining that the anomalous information related to the multimedia signal is received when the microphone of the first electronic device 11 is in the enabled state, the event processing module 115 may provide a second conference quality notification. The second conference quality notification indicates that a certain receiving end of the video conference (e.g., the second electronic device 12) does not normally receiving the audio signal transmitted by the first electronic device 11. In this way, the user of the first electronic device 11 may know that a certain video conference participant may not have successfully received the spoken content.

In the fifth embodiment, after providing the second conference quality notification, in response to determining that the screen sharing function of the first electronic device 11 is in an enabled state, the event processing module 115 may further provide a first prompt. The first prompt indicates to turn off the screen sharing function, so as to remind the user of the first electronic device 11 that less bandwidth may be occupied by disabling the screen sharing function. In addition, the event processing module 115 may also provide a specific time point when the audio signal is not received normally, and play a specific audio signal recorded from the audio signal from the specific time point. In this way, the participants of the video conference may review the spoken content of the user of the first electronic device 11 from the time point of disconnection.

In the sixth embodiment, the first electronic device 11 is, for example, a transmitting end of a video conference, and the multimedia signal includes a video signal. In the first scenario of the sixth embodiment, in response to determining that no anomalous information related to the multimedia signal is received when the screen sharing function of the first electronic device 11 is in the enabled state, the event processing module 115 may provide a third conference quality notification. The third conference quality notification indicates that the receiving end of the video conference (e.g., the second electronic device 12) is normally receiving the video signal transmitted by the first electronic device 11. In this way, the user of the first electronic device 11 may know that the shared screen has been successfully viewed by other participants in the video conference.

In the second scenario of the sixth embodiment, in response to determining that the anomalous information related to the multimedia signal is received when the screen sharing function of the first electronic device 11 is in the enabled state, the event processing module 115 may provide a fourth conference quality notification. The fourth conference quality notification indicates that a certain receiving end of the video conference (e.g., the second electronic device 12) does not normally receiving the video signal transmitted by the first electronic device 11. In this way, the user of the first electronic device 11 may know that a certain video conference participant may not have successfully viewed the shared screen.

In the sixth embodiment, after providing the fourth conference quality notification, in response to determining that the screen sharing function of the first electronic device 11 is in an enabled state, the event processing module 115 may further provide a first prompt. The first prompt indicates to turn off the screen sharing function, so as to remind the user of the first electronic device 11 that less bandwidth may be occupied by disabling the screen sharing function. In addition, the event processing module 115 may also provide a specific time point when the video signal is not received normally, and play a specific video signal recorded from the video signal from the specific time point. In this way, the participants of the video conference may review the screen shared by the user of the first electronic device 11 from the time point of disconnection.

To sum up, the method proposed by the embodiment of the disclosure may provide a corresponding conference quality notification according to the quality of the video conference, so that the user at the transmitting end may better grasp the reception of the shared screen and/or the spoken content for other participants in the video conference. Moreover, the embodiment of the disclosure may also replay the recorded screen and/or audio from the time point of the disconnection when the shared screen and/or the spoken content is disconnected, so that the participants in the video conference may review the shared screen and/or spoken content by the user of the transmitting end.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A video conference evaluation method, comprising:
   in response to determining that a first electronic device has participated in a video conference, collecting network health information by the first electronic device, and obtaining a transceiving state with respect to a multimedia signal of the first electronic device;
   in response to determining that the network health information indicates that a network quality of the video conference is unsatisfying, obtaining at least one first signal segment of the multimedia signal according to the transceiving state with respect to the multimedia signal by the first electronic device;

obtaining a first specific signal feature of the at least first signal segment by the first electronic device, and transmitting the first specific signal feature of the at least first signal segment; and providing a conference quality notification based on reception of anomalous information associated with the multimedia signal by the first electronic device, wherein the network health information comprises at least one of data packet round-trip time, data packet loss rate, audio packet round-trip time, audio receiving jitter, audio packet loss rate, video packet round-trip time, transmitted audio bit rate, transmitted video frame rate, and transmitted video resolution, wherein the call scenarios comprise a first call scenario, a second call scenario, a third call scenario, and a fourth call scenario;

wherein a first call quality index corresponding to the first call scenario is characterized as:

$$Q_c = (W_{tn}/T_n + W_{ln}/L_n)/(W_{tn} + W_{ln})$$

wherein a second call quality index corresponding to the second call scenario is characterized as:

$$Q_a = (W_{tn}/T_n + W_{ln}/L_n + W_{ta}/T_a + W_{ja}/J_a + W_{la}/L_a + W_{ba}*B_a)/$$
$$(W_{tn} + W_{ln} + W_{ta} + W_{ja} + W_{la} + W_{ba})$$

wherein a third call quality index corresponding to the third call scenario is characterized as:

$$Q_v = (W_{tn}/T_n + W_{ln}/L_n + W_{tv}/T_v +$$
$$W_{fv}*F_v + W_{hv}*H_v)/(W_{tn} + W_{ln} + W_{tv} + W_{fv} + W_{hv})$$

wherein a fourth call quality index corresponding to the fourth call scenario is characterized as:

$$Q_o = (W_{tn}/T_n + W_{ln}/L_n + W_{ta}/T_a +$$
$$W_{ja}/J_a + W_{la}/L_a*B_a + W_{ta}/T_v + W_{fv}*F_v + W_{hv}*H_v)/$$
$$(W_{tn} + W_{ln} + W_{ta} + W_{ja} + W_{la} + W_{ba} + W_{tv} + W_{fv} + W_{hv}),$$

wherein $T_n$ is the data packet round-trip time, $L_n$ is the data packet loss rate, $T_a$ is the audio packet round-trip time, $J_a$ is the audio receiving jitter, $L_a$ is the audio packet loss rate, $B_a$ is the video packet round-trip time, $T_y$ is the transmitted audio bit rate, $F_y$ is the transmitted video frame rate, and $H_y$ is the transmitted video resolution, and $W_{tn}$, $W^{ln}$, $W_{ta}$, $W_{ja}$, $W_{la}$, $W_{ba}$, $W_{tv}$, $W_{fv}$, $W_{hv}$ are weights corresponding to $T_n$, $L_n$, $T_a$, $J_a$, $L_a$, $B_a$, $T_y$, $F_y$, $H_y$ respectively.

2. The method according to claim 1, wherein the first electronic device is a transmitting end of the video conference, the multimedia signal comprises at least one of an audio signal and a video signal, and the transceiving state of the multimedia signal comprises a microphone enabling state and a screen sharing state.

3. The method according to claim 1, wherein the first electronic device is a receiving end of the video conference, the multimedia signal comprises at least one of an audio signal and a video signal, and the transceiving state of the multimedia signal comprises a speaker enabling state and a screen displaying state.

4. The method according to claim 1, comprising:
during the video conference, determining a call quality index of the first electronic device in each of a plurality of call scenarios based on the network health information that is collected by the first electronic device;
in response to determining that the call quality index corresponding to any of the call scenarios is lower than a corresponding index threshold, determining that the network health information indicates that a network quality of the video conference is unsatisfying by the first electronic device;
in response to determining that all of the call quality index corresponding to each of the call scenarios are not lower than the corresponding index threshold, determining that the network health information indicates that the network quality of the video conference is satisfactory by the first electronic device.

5. The method according to claim 1, wherein the at least one first signal segment comprises at least one specific audio frame, and obtaining the first specific signal feature of the at least one first signal segment comprises:
in response to determining that the first electronic device is a transmitting end, collecting at least one first audio frame recorded by the first electronic device as the at least one specific audio frame;
in response to determining that the first electronic device is a receiving end, collecting at least one second audio frame played by the first electronic device as the at least one specific audio frame;
obtaining an energy value of each of the specific audio frames by the first electronic device, and generating an energy value sequence accordingly;
using the energy value sequence as the first specific signal feature of the at least one first signal segment by the first electronic device.

6. The method according to claim 1, wherein the at least one first signal segment comprises at least one specific video frame, and obtaining the first specific signal feature of the at least one first signal segment comprises:
in response to determining that the first electronic device is a transmitting end, collecting at least one first video frame captured by the first electronic device as the at least one specific video frame;
in response to determining that the first electronic device is a receiving end, collecting at least one second video frame displayed by the first electronic device as the at least one specific video frame;
determining a plurality of feature points of each of the specific video frames by the first electronic device, and determining a feature point vector corresponding to each of the specific video frames accordingly;
using the feature point vector corresponding to each of the specific video frames as the first specific signal feature of the at least one first signal segment by the first electronic device.

7. The method according to claim 1, further comprising:
receiving the first specific signal feature from the first electronic device by a server, and receiving a second specific signal feature from a second electronic device, wherein the second electronic device also participates in the video conference;
determining a similarity between the first specific signal feature and the second specific signal feature;

in response to determining that the similarity is lower than a similarity threshold, transmitting the anomalous information associated with the multimedia signal to the first electronic device.

8. The method according to claim 1, wherein the first electronic device is a transmitting end of the video conference, the multimedia signal comprises an audio signal, and the method comprises:
in response to determining that the anomalous information associated with the multimedia signal is not received when a microphone of the first electronic device is in an enabled state, providing a first conference quality notification, wherein the first conference quality notification indicates that receiving ends of the video conference normally receive the audio signal transmitted by the first electronic device;
in response to determining that the anomalous information associated with the multimedia signal is received when the microphone of the first electronic device is in the enabled state, providing a second conference quality notification, wherein the second conference quality notification indicates that a certain receiving end of the video conference does not normally received the audio signal transmitted by the first electronic device.

9. The method according to claim 8, wherein after providing the second conference quality notification, the method further comprises:
in response to determining that a screen sharing function of the first electronic device is in an enabled state, providing a first prompt, wherein the first prompt indicates disabling the screen sharing function; or
providing a specific time point when the audio signal is not normally received, and playing a specific audio signal recorded from the audio signal from the specific time point.

10. The method according to claim 1, wherein the first electronic device is a transmitting end of the video conference, the multimedia signal comprises a video signal, and the method comprises:
in response to determining that the anomalous information associated with the multimedia signal is not received when a screen sharing function of the first electronic device is in an enabled state, providing a third conference quality notification, wherein the third conference quality notification indicates that receiving ends of the video conference normally receive the video signal transmitted by the first electronic device;
in response to determining that the anomalous information associated with the multimedia signal is received when the screen sharing function of the first electronic device is in the enabled state, providing a fourth conference quality notification, wherein the fourth conference quality notification indicates that a certain receiving end of the video conference does not normally receive the video signal transmitted by the first electronic device.

11. The method according to claim 10, wherein after providing the fourth conference quality notification, the method further comprises:
in response to determining that the screen sharing function of the first electronic device is in the enabled state, providing a first prompt, wherein the first prompt indicates disabling the screen sharing function; or
providing a specific time point when the video signal is not normally received, and playing a specific video signal recorded from the video signal from the specific time point.

12. A video conference evaluation system, comprising:
a first electronic device, configured to:
in response to determining that a first electronic device has participated in a video conference, collect network health information, obtain a transceiving state with respect to a multimedia signal of the first electronic device;
in response to determining that the network health information indicates that a network quality of the video conference is unsatisfying, obtain at least one first signal segment of the multimedia signal according to the transceiving state with respect to the multimedia signal;
obtain a first specific signal feature of the at least first signal segment, and transmit the first specific signal feature of the at least first signal segment; and
provide a conference quality notification based on reception of anomalous information associated with the multimedia signal,
wherein the network health information comprises at least one of data packet round-trip time, data packet loss rate, audio packet round-trip time, audio receiving jitter, audio packet loss rate, video packet round-trip time, transmitted audio bit rate, transmitted video frame rate, and transmitted video resolution, wherein the call scenarios comprise a first call scenario, a second call scenario, a third call scenario, and a fourth call scenario;
wherein a first call quality index corresponding to the first call scenario is characterized as:

$$Q_c = (W_{tn}/T_n + W_{ln}/L_n)/(W_{tn} + W_{ln})$$

wherein a second call quality index corresponding to the second call scenario is characterized as:

$$Q_a = (W_{tn}/T_n + W_{ln}/L_n + W_{ta}/T_a + W_{ja}/J_a + W_{la}/L_a + W_{ba}*B_a)/$$
$$(W_{tn} + W_{ln} + W_{ta} + W_{ja} + W_{la} + W_{ba})$$

wherein a third call quality index corresponding to the third call scenario is characterized as:

$$Q_v = (W_{tn}/T_n + W_{ln}/L_n + W_{tv}/T_v +$$
$$W_{fv}*F_v + W_{hv}*H_v)/(W_{tn} + W_{ln} + W_{tv} + W_{fv} + W_{hv})$$

wherein a fourth call quality index corresponding to the fourth call scenario is characterized as:

$$Q_o = (W_{tn}/T_n + W_{ln}/L_n + W_{ta}/T_a +$$
$$W_{ja}/J_a + W_{la}/L_a*B_a + W_{ta}/T_v + W_{fv}*F_v + W_{hv}*H_v)/$$
$$(W_{tn} + W_{ln} + W_{ta} + W_{ja} + W_{la} + W_{ba} + W_{tv} + W_{fv} + W_{hv}),$$

wherein $T_n$ is the data packet round-trip time, $L_n$ is the data packet loss rate, $T_a$ is the audio packet round-trip time, $J_a$ is the audio receiving jitter, $L_a$ is the audio packet loss rate, $B_a$ is the video packet round-trip time, $T_y$ is the transmitted audio bit rate, $F_y$ is the transmitted video frame rate, and $H_v$ is the transmitted video resolution, and $W_{tn}$, $W_{ln}$, $W_{ta}$, $W_{ja}$, $W_{la}$, $W_{ba}$, $W_{tv}$, $W_{fv}$, $W_{hv}$ are weights corresponding to $T_n$, $L_n$, $T_a$, $J_a$, $L_a$, $B_a$, $T_v$, $F_v$, $H_v$ respectively.

13. The video conference evaluation system according to claim 12, wherein the first electronic device performs:
   during the video conference, determining a call quality index of the first electronic device in each of a plurality of call scenarios based on the network health information that is collected by the first electronic device;
   in response to determining that the call quality index corresponding to any of the call scenarios is lower than a corresponding index threshold, determining that the network health information indicates that a network quality of the video conference is unsatisfying by the first electronic device;
   in response to determining that all of the call quality index corresponding to each of the call scenarios are not lower than the corresponding index threshold, determining that the network health information indicates that the network quality of the video conference is satisfactory by the first electronic device.

14. The video conference evaluation system according to claim 12, wherein the at least one first signal segment comprises at least one specific audio frame, and the first electronic device performs:
   in response to determining that the first electronic device is a transmitting end, collecting at least one first audio frame recorded by the first electronic device as the at least one specific audio frame;
   in response to determining that the first electronic device is a receiving end, collecting at least one second audio frame played by the first electronic device as the at least one specific audio frame;
   obtaining an energy value of each of the specific audio frames by the first electronic device, and generating an energy value sequence accordingly;
   using the energy value sequence as the first specific signal feature of the at least one first signal segment by the first electronic device.

15. The video conference evaluation system according to claim 12, wherein the at least one first signal segment comprises at least one specific video frame, and the first electronic device performs:
   in response to determining that the first electronic device is a transmitting end, collecting at least one first video frame captured by the first electronic device as the at least one specific video frame;
   in response to determining that the first electronic device is a receiving end, collecting at least one second video frame displayed by the first electronic device as the at least one specific video frame;
   determining a plurality of feature points of each of the specific video frames by the first electronic device, and determining a feature point vector corresponding to each of the specific video frames accordingly;
   using the feature point vector corresponding to each of the specific video frames as the first specific signal feature of the at least one first signal segment by the first electronic device.

16. The video conference evaluation system according to claim 12, wherein the first electronic device further performs:
   receiving the first specific signal feature from the first electronic device by a server, and receiving a second specific signal feature from a second electronic device, wherein the second electronic device also participates in the video conference;
   determining a similarity between the first specific signal feature and the second specific signal feature;
   in response to determining that the similarity is lower than a similarity threshold, transmitting the anomalous information associated with the multimedia signal to the first electronic device.

17. The video conference evaluation system according to claim 12, wherein the first electronic device is a transmitting end of the video conference, the multimedia signal comprises an audio signal, and the first electronic device performs:
   in response to determining that the anomalous information associated with the multimedia signal is not received when a microphone of the first electronic device is in an enabled state, providing a first conference quality notification, wherein the first conference quality notification indicates that receiving ends of the video conference normally receive the audio signal transmitted by the first electronic device;
   in response to determining that the anomalous information associated with the multimedia signal is received when the microphone of the first electronic device is in the enabled state, providing a second conference quality notification, wherein the second conference quality notification indicates that a certain receiving end of the video conference does not normally received the audio signal transmitted by the first electronic device;
   in response to determining that a screen sharing function of the first electronic device is in an enabled state, providing a first prompt, wherein the first prompt indicates disabling the screen sharing function; or
   providing a specific time point when the audio signal is not normally received, and playing a specific audio signal recorded from the audio signal from the specific time point.

18. The video conference evaluation system according to claim 12, wherein the first electronic device is a transmitting end of the video conference, the multimedia signal comprises a video signal, and the first electronic device performs:
   in response to determining that the anomalous information associated with the multimedia signal is not received when a screen sharing function of the first electronic device is in an enabled state, providing a third conference quality notification, wherein the third conference quality notification indicates that receiving ends of the video conference normally receive the video signal transmitted by the first electronic device;
   in response to determining that the anomalous information associated with the multimedia signal is received when the screen sharing function of the first electronic device is in the enabled state, providing a fourth conference quality notification, wherein the fourth conference quality notification indicates that a certain receiving end of the video conference does not normally receive the video signal transmitted by the first electronic device;
   in response to determining that the screen sharing function of the first electronic device is in the enabled state, providing a first prompt, wherein the first prompt indicates disabling the screen sharing function; or providing a specific time point when the video signal is not normally received, and playing a specific video signal recorded from the video signal from the specific time point.

* * * * *